Feb. 9, 1932.  C. H. PATTERSON  1,844,176
COLT AND CALF WEANER
Filed Dec. 29, 1930  2 Sheets-Sheet 2
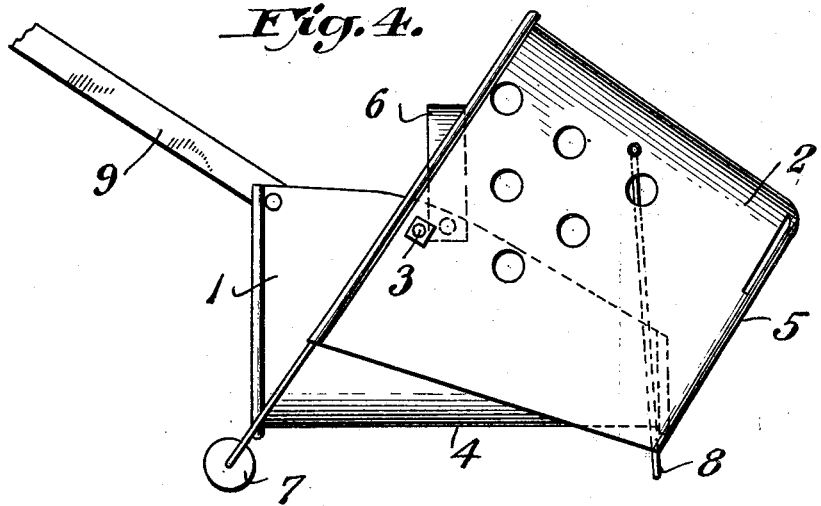
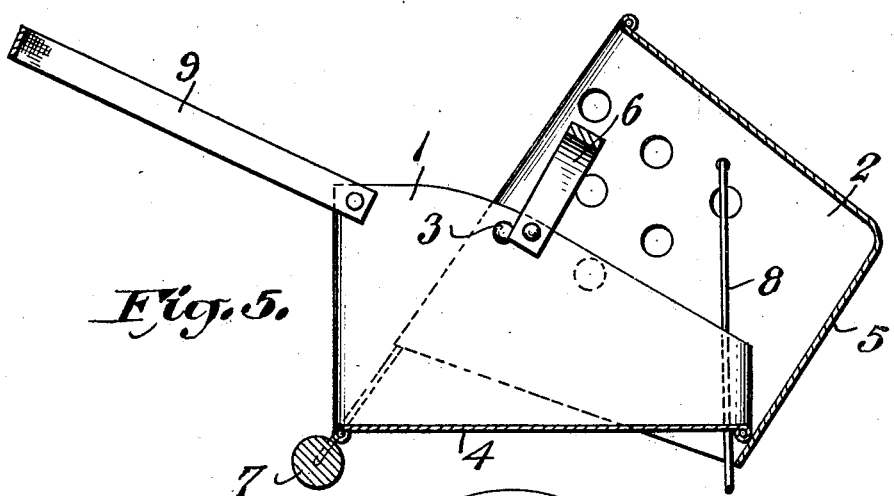
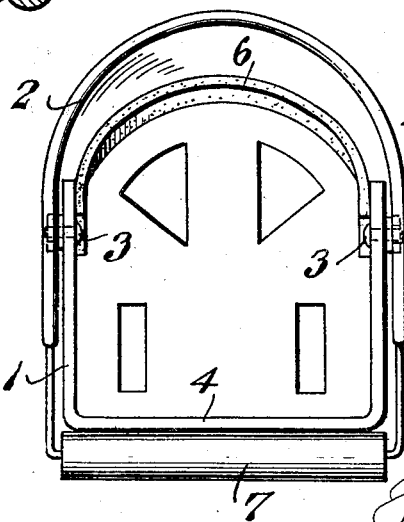
Inventor:
Charles H. Patterson
By James J. Sheehy Attys.

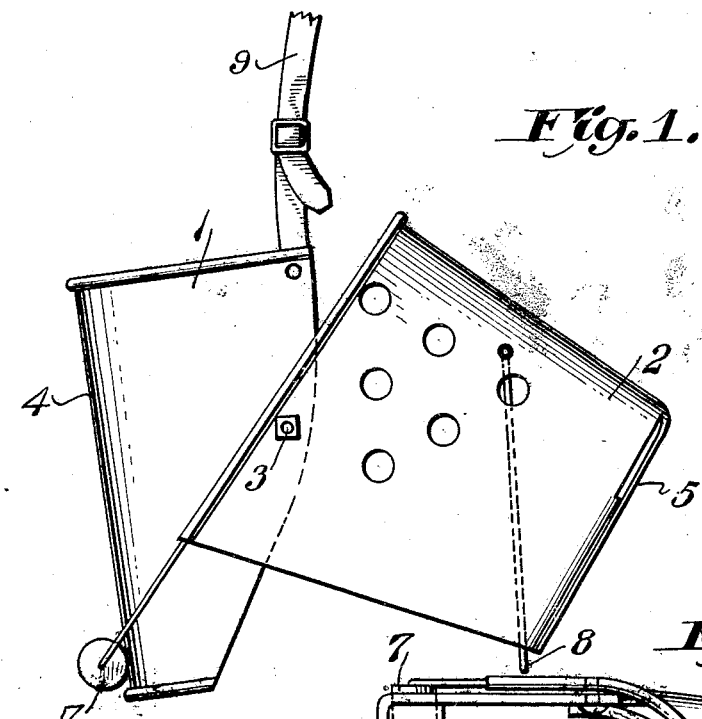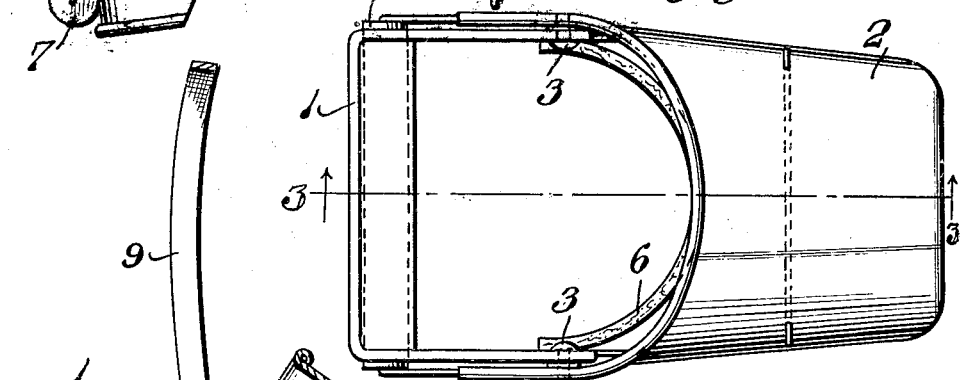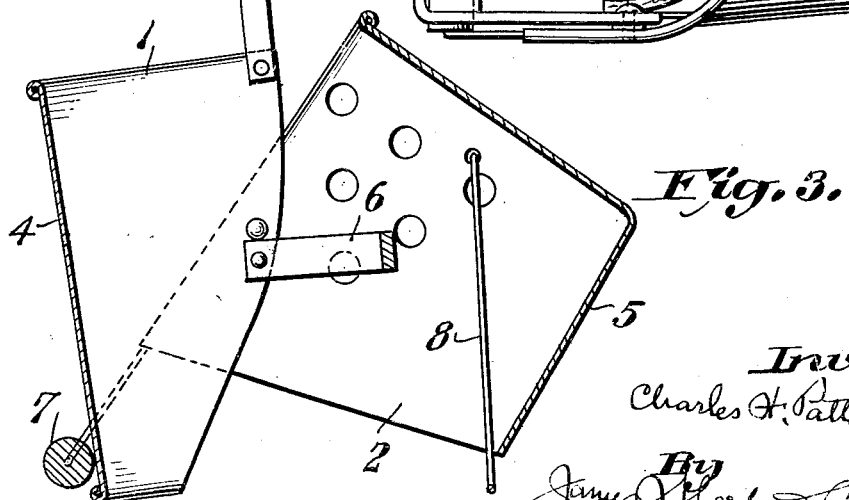

Patented Feb. 9, 1932

1,844,176

UNITED STATES PATENT OFFICE

CHARLES H. PATTERSON, OF ENUMCLAW, WASHINGTON

COLT AND CALF WEANER

Application filed December 29, 1930. Serial No. 505,364.

My present invention pertains to calf and colt weaners and it is also adapted for use on cows and horses and it contemplates the provision of an extremely simple and positively operating weaner through the medium of which grazing animals may be prevented from injuring trees, shrubbery and the like and this without inflicting injury to the animal.

The weaner is also adapted for use on animals that graze in pastures or other acreage where hay, grain or other commodities are stored and my novel arrangement of weaner will make it impossible for the animal to eat or otherwise destroy such commodities.

Other objects of the invention will be fully understood from the following description and claims when the same are read in connection with the drawings accompanying and forming part of this specification:

Figure 1 is a side elevation in which the weaner is shown in the position it assumes when the animal is grazing and illustrating in dotted lines the lower portion of the weaner as broken away.

Figure 2 is a top plan view illustrating the weaner in closed or non-grazing position.

Figure 3 is a transverse section taken in the plane indicated by line 3—3 of Figure 2 and looking in the direction of the arrows.

Figure 4 is a side elevation of the weaner in closed position.

Figure 5 is a sectional view of Figure 4.

Figure 6 is a view looking into the weaner from the rear or open end thereof.

Similar numerals of reference designate corresponding parts in all the views of the drawings.

My novel weaner is preferably formed of galvanized tin and comprises the lower portion 1 and the upper portion 2; said portions being pivotally hinged at 3 and the lower portion 1 is provided with the straight lower wall 4 while the upper portion 2 is formed with the closed front end 5 that is ventilated in any manner deemed expedient. Secured in the interior and at the upper and forward portions of the lower member 1 is a strap or bail 6 that is adapted to engage the upper part of the muzzle of the animal whereby raising and lowering of the muzzle will assist in the easy opening and closing of the member 1 with respect to the member 2 and at the same time this strap precludes chaffing or injury to the muzzle of the animal.

The upper member 2 of the weaner is provided with a weight 7 which balances the upper member at a position in front of the nostrils of the animal and leaving nothing of the upper portion in front of the mouth of the animal. Hence when grazing the animal may do so whether the grass or the like is short or long. This weight is secured on a bail that extends completely around the open end of the member 2. It will be noted that the lower wall 4 of the member 1 is flanged at its forward end and the purpose of this flange is to be engaged by a wire bail 8 that is pivotally arranged in the member 2 of the weaner. This wire bail hangs on the inside and drops over the lower member 2 and in conjunction with the flange above referred to locks the member 1 to the member 2 when the animal raises its head in a horizontal position and attempts to open its jaws when the head is in such position. However, when the head is lowered to a perpendicular position the wire bail moves rearwardly and when the animal opens its jaws to graze the strap 6 will force the lower member 1 to the open position and the flanged edge of the wall 4 will ride past the bail 8 and this will unlock the member 1 from the member 2 and enable the animal to graze. At the same time, the weight will balance the member 2 to a position out of the way of the mouth of the animal.

It will be gathered from the foregoing that my novel device will prevent calfs and the like from eating off of fruit trees and is adapted for all kinds of animals in pasture of fields where hay and grain is stacked and at the same time the device may either be made of sheet metal, woven wire or the like and when the head of the animal is lowered to the natural grazing position the bottom of the weaner is wide open.

The weaner automatically locks and unlocks on the raising and lowering of the head of the animal and because of its construction injury to the muzzle of the animal is precluded.

In addition the balancing of the members or jaws of the weaner with respect to each other is accomplished in such a manner that no annoyance from wearing the weaner is caused the animal.

The device comprises but a few elements and these are such as to produce positive working of the weaner at all times and there are no elements that can wear out or become inoperative after a short period of use.

I show an ordinary strap or fastening device 9 that is adapted to secure the weaner around the head of the animal and this strap may be adjustable in any well known manner.

What I claim is:—

1. A weaner comprising two members pivotally arranged with respect to each other; one of said members being provided with a foraminous forward portion, a weight secured to one of the portions, a wire bail secured to said portion and pivotally arranged therein, a flange formed on one of the portions, a strap secured to the second portion and adapted to rest interiorly of the first portion and means for securing the weaner about the head of the animal.

2. A weaner comprising an upper member, a weight secured to one end of the upper member, a bail pivotally arranged in the upper member, a lower member having means for securing the weaner on an animal, a strap secured interiorly on the lower member, means formed on the lower member for co-acting with the bail of the upper member and means engaging the upper and lower member for pivoting said members to each other.

3. A weaner comprising two pivotally arranged jaws, a strap secured interiorly on one of the jaws and extending into the other, a weight secured to the upper jaw of the weaner and means arranged on the lower jaw for limiting downward movement of the lower jaw with respect to the upper jaw and a bail pivotally arranged on the upper jaw for coacting with the last named means, substantially as and for the purpose specified.

In testimony whereof I have hereunto set my hand.

CHARLES H. PATTERSON.